May 24, 1955
C. W. KINCAID
2,708,992
AUTOMATIC TRANSMISSION
Filed April 8, 1954
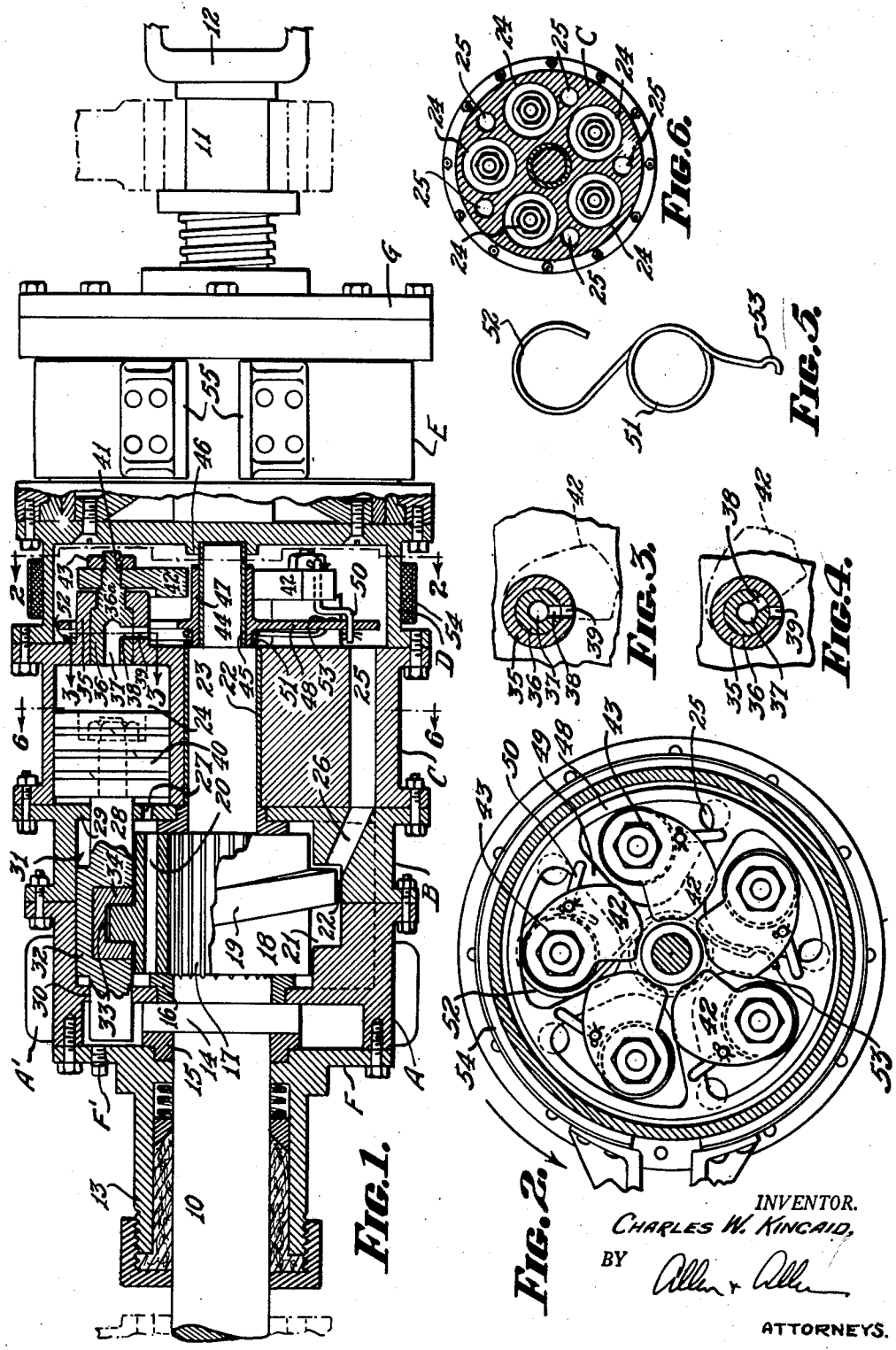
INVENTOR.
CHARLES W. KINCAID,
BY
ATTORNEYS.

United States Patent Office 2,708,992
Patented May 24, 1955

2,708,992
AUTOMATIC TRANSMISSION

Charles W. Kincaid, Cincinnati, Ohio

Application April 8, 1954, Serial No. 421,908

7 Claims. (Cl. 192—59)

This invention relates to automatic transmissions and more particularly to transmissions useful in vehicles powered by internal combustion engines.

It is a well known characteristic of the internal combustion engines that they deliver very little power at slow speeds so that when internal combustion engines are used in vehicles such as automobiles, it is necessary to provide some means whereby the engine can run at a relatively high speed as the vehicle starts up. For many years, this was accomplished by means of a gear box and a shifting lever, by means of which the gear ratio between the engine shaft and the drive shaft could be changed.

More recently various types of automatic transmissions have come into general use. Some of these involve gear shifting apparatuses with centrifugal means for producing a shifting of the gears and others involve the use of a so-called torque converter principle. The former type has proved quite successful although the shifting of the gears is accompanied by a slight jerk and the latter has also been quite successful except for the fact that it is quite noisy and consumes great amounts of fuel. Both systems are subject to the disadvantage that they are quite complicated and involve a great many parts, so that they are expensive to manufacture and awkward to repair.

With these considerations in mind, it is an object of the present invention to provide an automatic transmission which will avoid the objections above outlined while combining the better qualities of the known transmissions. More particularly it is an object of the invention to provide a transmission which will be relatively simple in construction and, therefore, less expensive to manufacture and service. Another object of the invention involves the provision of such a transmission which is compact and which will be economical of fuel. Still another object involves the provision of a transmission as outlined above which will not easily get out of adjustment so that it will not require complicated or expensive service.

These and other objects of the invention which I shall point out in more detail hereinafter or which will be apparent to one skilled in the art upon reading these specifications, I accomplish by that certain construction and arrangement of parts of which I shall now describe an exemplary embodiment.

Reference is made to the drawings forming a part hereof and in which

Figure 1 is a longitudinal cross sectional view of a transmission according to the invention.

Figure 2 is a transverse cross sectional view taken on the line 2—2 of Figure 1.

Figure 3 is a fragmentary cross sectional view taken on the line 3—3 of Figure 1 showing one of the valves in open position.

Figure 4 is a view similar to Figure 3 and showing the valve in closed position.

Figure 5 is an elevational view of a spring member used in the transmission, and Figure 6 is a cross sectional view on a reduced scale taken on the line 6—6 of Figure 1.

Briefly, in the practice of the invention, I provide a casing element which is secured to the drive shaft of the vehicle and adapted to rotate therewith. Coaxially with the drive shaft at the other end is a shaft entrance through which the engine shaft enters the casing. The shaft entrance is provided with a seal or packing gland and the engine shaft has a bearing within the casing. A cam element is associated with the engine shaft within the casing.

The casing is provided with a cylinder block element through which the drive shaft passes and in which the drive shaft has a bearing and a plurality of cylinders are formed annularly of the cylinder block in symmetrical relation about the engine shaft. A piston is arranged within each cylinder and each piston is provided with a rod having means for engaging the cam above mentioned. At each end of each cylinder there is a port and a plurality of fluid return passages are provided in the cylinder block.

The port at the head end of each cylinder is provided with a valve which is normally held open by spring means and which is adapted to close as a result of centrifugal action.

The principle of operation of the transmission is that when the vehicle is at a standstill and the engine is in operation at idling speed, the cam on the engine shaft produces reciprocation of the various pistons in their cylinders and since the valves are all open, the fluid in the system is simply pumped back and forth. In this situation, there is little resistance to the pumping action and the casing and drive shaft are stationary. If now the engine is accelerated so that a great quantity of oil is being pumped back and forth, more and more resistance is reacted because of the restricted size of the ports in the cylinders and as a result of this resistance the cam has progressively greater difficulty in producing a reciprocation of the pistons, so that the case itself and the drive shaft which is connected thereto begin to rotate. As the vehicle picks up speed and the casing rotates faster, the centrifugal valves are operated to close the ports in the various cylinders gradually until the ports are completely closed. As soon as the ports are closed, the fluid system is locked and the engine shaft is locked to the casing and a direct drive is achieved between the engine shaft and the drive shaft.

Referring now more specifically to the drawings, the engine shaft is indicated at 10 and it will be understood to be connected directly or through a coupling with the engine crank shaft. The vehicle drive shaft is indicated at 11 and it will be understood that this is connected to the universal joint diagrammatically indicated at 12. The drive shaft 11 is integral with the casing which, as shown in the drawing, may be made up, for convenience in manufacture and repair, of five sections with end plates which are all bolted together. The various parts of the casing have been indicated for convenience by the letters A, B, C, D and E. The engine end of the transmission is closed by a head member F and the drive shaft end is closed by a head G which is integral with or keyed to the drive shaft 11.

The end plate F is preferably provided with a suitable packing gland or shaft seal indicated generally at 13, the details of which will not be described because they do not constitute a part of the present invention.

The drive shaft 10 is provided with an enlarged portion 14 which cooperates with bearing elements 15 and 16 to fix the engine shaft and casing with respect to each other in an axial direction. The drive shaft is provided with an enlarged portion 17 which is splined or grooved as shown and it carries the cam hub 18. The cam hub 18 is provided with the raised cam element 19 peripherally thereof and it is also provided with the fluid passages 20. The casing portions A and B have the annular recesses 21 and 22 to accommodate the cam element 19 when the engine shaft is rotating and the casing is stationary.

The portion C has a central bearing aperture which may be lined with a bushing 22 to provide a bearing for the portion 23 of the engine shaft. The portion C is provided with a plurality of cylinder bores 24 and a plurality of fluid flow passages 25. In the particular transmission illustrated, there are shown five such cylinders 24 symmetrically disposed about the engine shaft and there are five drain passages 25 also symmetrically disposed in the portion C. The portion B is provided with the drain passages 26 which communicate with the passages 25 and also with the ports 27 in the portions thereof which constitute piston heads at the rod ends of the pistons.

Each piston is provided with a rod 28 which passes through an aperture in the wall 29 of the portion B and also through an aperture in the wall 30 of the portion A. Intermediate the walls 29 and 30 in the members A and B is formed a bore 31 in which an enlarged portion 32 of the piston rod may reciprocate. In the portion 32 of the rod there is provided a bore which constitutes a seat for the saddle disc 34 having the groove 33 to engage the cam element 19.

The member C is formed at its other end with a plurality of valve bosses 35. Within these bosses are locked the plug valves 36 which include an axial passage 37 intersected by a radial passage 38. The member 35 is provided with a passage 39. From a consideration of Figures 3 and 4, it will be clear that the plug valve member 36 may be rotated from the position in Figure 3, in which the passages 38 and 39 are aligned, to the position of Figure 4 in which the passages 38 and 39 are out of alignment and the valve is closed to the passage of fluid. The movement of the plug valve members 36 is produced centrifugally as will be pointed out hereinafter.

It will be noted that the valve bosses 35 extend into the portion D of the casing which is hollow and it will be clear that oil to the right of the pistons 40 can flow from the cylinder 24 through the ports 37, 38 and 39 into the inside of the portion D. Oil to the left of the pistons can flow back and forth through the ports 27 and the space 27a. It will be clear that as one piston is expelling oil, another is taking it in, so that the total volume at each end of the cylinder block does not change. The passages 25 and 26 are merely for filling and draining purposes. The entire system is filled with a fluid, and when the valves 38, 39 are open and the vehicle is stationary while the engine is turning over, there is simply a back and forth movement of oil within the system. Oil is simply circulated among the various cylinders at each end of the cylinder block.

The centrifugal mechanism is housed within the portion D of the casing. Each of the plug valve members 36 is provided with reduced portion 36a which passes through an aperture formed in the valve boss 35 and is threaded on its extending end as at 41. A centrifugal member 42 is screwed onto the portion 41 of each plug valve and is locked in place by means of a lock nut 43. The reduced portion 44 at the end of the engine shaft is provided with a bronze sleeve or the like as at 45, having a bearing in a bearing boss 46 in the member D and a hub 47 carrying a spider 48 has a bearing on the sleeve 45. Preferably the spider 48 has a number of arms 49 equal to the number of cylinders 24. Each arm 49 of the spider 48 is linked to a corresponding centrifugal element 42 by means of a link 50. A spring, shown in detail in Figure 5, has a number of convolutions 51 which are disposed about the hub 47 and one end of the spring is provided with a hook element 52 which engages over one of the valve bosses 35. The other end is provided with a hook element 53 which is secured to one of the arms 49 of the spider 48. The action of the spring is to maintain the spider normally in a position so that all of the centrifugal elements 42 maintain the respective valves 38 in open position during idling of the engine.

The external portion of the member D may constitute a brake drum for a parking brake. The parking brake is indicated generally at 54. It will not be described further because it may be operated in conventional manner.

The portion E of the assembly may contain a reversing mechanism, but since the reversing mechanism forms no part of the present invention, it will not be described in detail. It may be of the planetary type which may be actuated by tightening a band by means of the yokes 55.

The operation of the transmission is as follows: Assuming that the engine is turning at idling speed and the vehicle is stationary, the drive shaft 11 and the entire casing (portions A to G inclusive) will be stationary. As the engine shaft rotates, the cam 19 will produce a reciprocation of the various pistons 40 in the respective cylinders 24. This will simply produce a circulatory movement of the fluid in the system as outlined above. The size of the passages 38 and 39 is determined such that at idling speed there is very low resistance to the reciprocation of the pistons.

As the throttle is opened to increase engine speed, the reciprocation of the pistons increases in speed and correspondingly the resistance to the flow of the fluid through the passages 38 and 39 increases. Depending upon the particular size of these passages, a point is reached where the resistance to the fluid flow is so great that there is a tendency to lock the pistons and their rods to the cam so that the entire casing begins to turn with the engine shaft 10. This action continues while the vehicle gains speed and as the speed of the vehicle increases, the centrifugal members 52 begin to move outwardly in unison and as controlled by the spider 48 and the spring 51 until at a certain speed the valves close entirely, as shown in Figure 4. When the valves attain the position of Figure 4, no fluid flow through the system is possible and therefore the pistons and their rods are effectively locked to the cam 19 and thus to the drive shaft and a direct drive is achieved between the shafts 10 and 11.

It will be clear that with the vehicle going down hill, a braking effect is maintained because as long as the valves are closed, as in Figure 4, the engine serves to brake the vehicle.

As the vehicle is brought to a stop, the valves gradually open to the position of Figure 3 and the pistons may then again pump fluid back and forth as in the beginning.

Cooling fins may be provided and are desirable. I have indicated such fins on the casing portion A at A'. A filler plug is shown in the plate F at F'.

It will be seen that I have provided a relatively simple transmission with a minimum of moving parts and that, because an absolutely direct drive is ultimately assured, the drive will be very economical as far as fuel consumption is concerned.

It will also be understood that numerous modifications may be made without departing from the spirit of the invention and I, therefore, do not intend any limitations other than those specifically set forth in the appended claims.

Having now fully described the invention, what I claim as new and desire to secure by Letters Patent is:

1. An automatic transmission for a vehicle powered by an internal combustion engine, comprising a casing secured to a drive shaft and having a coaxial shaft entrance, an engine shaft entering said shaft entrance and having a bearing in said casing, a seal between said engine shaft and shaft entrance, an annular cylinder block formed in said casing around said engine shaft, a plurality of cylinders symmetrically disposed in said block with their axes parallel to said engine shaft, a port at each end of each cylinder, a plurality of fluid return passages through said block, a piston in each of said cylinders having a rod, a cam associated with said engine shaft, each of said rods having a transverse bore, and a saddle disc rotatably seated in said bore, said saddle disc having a groove in sliding engagement with said cam, whereby said cam actuates said rods without binding, a valve for the port at the head end of each cylinder, centrifugal means associated with each valve to move it toward closed position under the influence of centrifugal force, and resilient means to normally hold said valves in open position.

2. A transmission according to claim 1, wherein the head of each cylinder is provided with a valve boss having a radial port and an axial aperture, a plug valve in said boss having a partial axial bore communicating with said cylinder and a radial bore communicating with said axial bore and normally aligned with said radial port, said plug valve having a portion extending through said aperture, and actuating means secured to said extending portion.

3. A transmission according to claim 2, wherein a spider is oscillatably mounted on said engine shaft, each of said actuating means comprising a weight adapted to act centrifugally, each said weight being linked to said spider, and spring means acting on said spider to resist the centrifugal movement of said weights to maintain said valves normally open.

4. A transmission according to claim 1, wherein there are five cylinders and wherein the head of each cylinder is provided with a valve boss having a radial port and an axial aperture, a plug valve in said boss having a partial axial bore communicating with said cylinder and a radial bore communicating with said axial bore and normally aligned with said radial port, said plug valve having a portion extending through said aperture, and actuating means secured to said extending portion.

5. A transmission according to claim 4, wherein a spider is oscillatably mounted on said engine shaft, each of said actuating means comprising a weight adapted to act centrifugally, each said weight being linked to said spider, and spring means acting on said spider to resist the centrifugal movement of said weights to maintain said valves normally open.

6. In an automatic transmission between an engine shaft and a drive shaft of a vehicle powered by an internal combustion engine, a casing secured to said drive shaft and containing a closed fluid circuit including a cylinder, a piston having a rod in said cylinder, a cam associated with said engine shaft, said rod having a transverse bore, a saddle disc rotatably seated in said bore, said saddle disc having a groove in sliding engagement with said cam, whereby said cam actuates said rod without binding, a valve in said circuit, means tending normally to hold said valve in open position, and means responsive to the speed of said drive shaft to close said valve.

7. A transmission according to claim 6 in which there are a plurality of said cylinders, pistons and rods symmetrically disposed, and a valve and associated means for each cylinder.

References Cited in the file of this patent

UNITED STATES PATENTS

| 2,215,103 | Holpfer | Sept. 17, 1940 |
| 2,370,640 | Deardorff et al. | Mar. 6, 1945 |
| 2,408,574 | Morris | Oct. 1, 1946 |